United States Patent Office 3,846,104
Patented Nov. 5, 1974

3,846,104
HANDLING GLASS SHEETS FOR
SHAPING AND COOLING
Samuel L. Seymour, Oakmont, Pa., assignor to PPG
Industries, Inc., Pittsburgh, Pa.
Filed Jan. 10, 1973, Ser. No. 322,580
Int. Cl. C03b 23/02
U.S. Cl. 65—104                              16 Claims

ABSTRACT OF THE DISCLOSURE

Method and apparatus for shaping and cooling glass sheets. Each glass sheet to be treated in turn is heated to its deformation temperature and conveyed by a continuous conveyor through a furnace and then into a glass shaping station, then a cooling station and finally to an unloading station. The glass sheet is stopped in alignment with a lower shaping mold that moves vertically between a recessed position and a raised position in juxtaposition to an upper mold. At the shaping station, the lower shaping mold lifts the glass into pressurized engagement against the upper mold. The upper mold comprises a vacuum chamber that is evacuated to hold the shaped glass sheet thereagainst while the lower mold is retracted downward and a tempering ring having an outline supporting surface conforming to but slightly inside the bent glass sheet periphery is brought into position in alignment between the upper and lower molds. The vacuum on the upper mold is released to deposit the shaped glass sheet on the tempering ring. The latter supports the bent glass sheet near its periphery during movement to and residence at a cooling station where the shaped glass sheet is quenched as rapidly as needed to impart at least a partial temper to the glass. The tempering ring is then unloaded and returned to a position adjacent the shaping station preparatory to repeating the cycle.

---

The present invention is capable of providing a more rapid vacuum forming operation than the prior art in that it makes it possible to cool one glass sheet while supported on the shaped tempering ring while the outline shaping mold and vacuum mold are shaping a succeeding glass sheet in a mass production operation. This was not possible in the prior art vacuum shaping operations where either the outline shaping mold or the vacuum bending mold was used to both shape the glass and transport it to the cooling station.

BACKGROUND OF THE INVENTION

1. Field of the Invention

This invention relates to the shaping and cooling of glass sheets and particularly relates to the so-called vacuum forming process by which glass sheets are initially heated to a deformation temperature, then brought into pressurized engagement against an upper mold having a vacuum chamber while heat softened and then cooled. The vacuum chamber of the upper mold has a shaping surface facing downward that conforms to the shape desired for the heat-softened glass sheet. In the past, glass sheets were mounted on a conveyor provided with spaced pusher members and floated over a gaseous support bed through a heating furnace. Toward the exit of the furnace, a special shuttle arrangement removed a glass sheet from the furnace and brought it to a glass shaping station where an outline mold lifted the glass sheet into engagement with the upper mold and then either transferred the glass to a cooling station where the glass was deposited onto a glass supporting mechanism comprising a plurality of fingers that supported the glass while it was moved through a cooling station or the upper mold moved with the glass sheet supported thereagainst by suction to the cooling station where the vacuum was released to deposit the glass sheet on a conveyor assembly.

In the both types of prior art operation, it was almost impossible to reduce the time for a cycle of operations because one of the shaping molds was required to convey the glass sheet horizontally from the shaping station to the cooling station and return to the shaping station after helping shape the glass. In the first embodiment, complicated controls are required to impart a cycle of movements comprising vertical movements needed to raise the lower mold into engagement with the upper vacuum mold and to retract the lower mold and horizontal movements needed to transfer the shaped glass from the shaping station to the cooling station and to return to the shaping station. In the second embodiment in which the vacuum mold transfers the shaped glass between the shaping station and the conveyor assembly, the heavy mass of the mold also makes rapid operation difficult to attain, but, in addition causes the vacuum mold to have a cyclic movement between a hot location above the extension of the hot gaseous bed on which the hot glass sheets are supported and a relatively cold location at the cooling station. Such temperature cycling has a harmful effect on the vacuum mold.

DESCRIPTION OF THE PRIOR ART

The following patents relate to vacuum forming glass sheets comprising heating said sheets while supported on a gaseous bed in close juxtaposition to an apertured ceramic bed through the apertures of which hot gases are provided to both support the glass and heat it to its deformation temperature and then bring the heat-softened glass sheet into pressurized engagement between an upper vacuum mold and a lower outline mold having complementary shaping surfaces conforming to that desired for the glass sheets by a process that includes the application of a vacuum through openings in the shaping wall of the vacuum mold to help impart a more exact shape to the heat-softened glass sheet.

U.S. Pat. No. 3,468,645 to McMaster et al. uses an open-centered-endless loop frame that is raised from a recessed position to engage the periphery of a glass sheet heated to its deformation temperature while supported on fluid and lifts the sheet into engagement with sheet shaping means that may be evacuated. The loop frame continues to support the glass during the cooling that follows the shaping step. The loop frame thus supports the glass throughout the shaping and cooling cycle so that the frame is not ready for the next cycle until the frame is unloaded and returned to its recessed position after having served to support the glass for both the entire shaping step and at least part of the cooling step.

U.S. Pat. No. 3,607,187 to McMaster discloses two embodiments of vacuum forming apparatus that uses the vacuum mold to transfer a glass sheet from one station to another. In one embodiment, the vacuum mold transfers the glass from the furnace conveyor to the shaping station. In the other embodiment, the conveyor extends through the furnace, the shaping station and the cooling station and the vacuum mold removes the deformable glass sheet from the conveyor by vacuum to shape the glass sheet partly by suction, moves with the glass sheet from the shaping station to the cooling station and redeposits the shaped sheet on the conveyor at the cooling station. The vacuum mold is massive so that it is a slow operation to transfer the glass from one position to another using the vacuum mold and to return the vacuum mold to a position where it is ready to receive the next glass sheet. Also, the vacuum mold is subjected to repetitive temperature cycling which tends to have a weakening effect on the vacuum mold.

U.S. Pats. Nos. 3,607,200 and 3,700,425 to McMaster disclose a vacuum shaping apparatus comprising a shaping frame that lifts the glass into engagement with a vacuum mold where it is shaped and then transfers the shaped glass to a cooling station, where the glass must be supported about its periphery for sufficient time to enable it to resist deformation when glass engaging pads or fingers take over the support of the reciprocating glass sheet in the cooling station. Therefore, the shaping frame takes an irreducible time to complete a round trip between the shaping station and the cooling station and ino a retracted position to receive a succeeding glass sheet at the shaping station. Also, the fingers used to support the glass while the latter is reciprocated between an upper array and a lower array of tempering nozzles after removal from the shaping frame do not provide as positive a support as the shaping frame. Hence, glass sheets are likely to be dropped during the cooling operation, thereby necessitating a stop in the glass treatment operation.

SUMMARY OF THE INVENTION

The present invention makes possible a faster bending and tempering cycle than the prior art by providing method and apparatus in which a shaping mold moves only vertically at the shaping station, the vacuum mold remains at the shaping station and means to support a glass sheet adjacent its marginal or peripheral edge only, preferably comprising a tempering ring, moves generally horizontally between the shaping station and the cooling station so that it is possible to cool one glass sheet while another is being shaped, thus making it possible to reduce the duration of a shaping and cooling cycle. The tempering ring is shaped to conform to the outline of the bent glass sheet so that the latter is supported more securely during cooling than by the spaced fingers of the prior art, even though the tempering ring is reciprocated while supporting the bent glass sheet in the cooling station. The present invention is characterized by first supporting a heated glass sheet on a lower shaping mold, then sandwiching the glass sheet between said lower shaping mold and an upper shaping mold, then holding the shaped glass sheet against the upper mold while retracting the lower mold, then transferring the shaped glass sheet to a tempering ring having an outline support surface that conforms to the shape of the shaped glass sheet but is slightly smaller in extent and provides sufficient support points around the shaped glass sheet periphery to positively support the shaped glass sheet during its transfer to and residence at the cooling station.

Preferably, both the lower mold and the tempering ring are of outline configuration. The lower mold is of very rigid construction and has a shaping surface conforming in elevation and outline to the shape desired for the shaped glass sheet and may be either of a continuous frame construction if the shape to be imparted is comparatively shallow or constructed of articulated sections movable between a spread-apart position and a closed position to provide a continuous shaping frame that engages and supports the marginal portion of the glass sheet at the shaping station. The lower shaping mold, when of frame-type construction, encloses a central opening that permits the supported glass sheet to be exposed to hot gas issuing from an extension of the furnace hearth, which extension is located at the shaping station. The direct exposure of the glass sheet to the hot gas at the shaping station prevents the glass sheet from cooling to a temperature too cool for tempering before it leaves the shaping station.

The tempering ring preferably comprises a thin, continuous rail of the outline type that has an upper edge surface that conforms in elevation and outline to the shape of the glass sheet adjacent to but slightly inward of the glass sheet margin. The upper edge surface is serrated and the rail is aperturated to provide many passages for the escape of chilling medium, such as air blasts, that impinge on the under surface of the shaped glass sheet supported on the tempering ring. The tempering ring provides a sufficient number of support points around the marginal portion of the glass sheet to insure that the shaped glass sheet is positively supported thereon, even when the tempering ring is reciprocated at the cooling station.

The present invention will be better understood in the light of the description of illustrative embodiments that follow, which description includes the accompanying drawings, wherein like reference numbers refer to like structural elements.

DESCRIPTION OF THE PREFERRED EMBODIMENTS

Referring now to the drawings wherein like numerals indicate like or corresponding parts throughout the several views, an apparatus for treating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station 15 beyond the cooling station 14 are located on the right of the apparatus. An intermediate or shaping station 16 is disposed between the furnace 12 and cooling station 14 and also comprises part of the means for heating the sheets of glass. Heat may be supplied by hot gases from gas burners or by electrical radiant heaters or by a combination of both, which are well known in the art. A vertically movable shield 17 is located between the cooling station 14 and the shaping station 16. When the shield 17 is raised, it protects the shaping station 16 and the furnace 12 from cool blasts of air imparted at the cooling station 14. The heating means includes a gaseous support bed 18 which extends only through the furnace 12 and a support bed extension 19 located at the shaping station 16. Both the support bed 18 and the extension 19 have vertical apertures through which hot gases are dispensed to both heat and support glass sheets conveyed through the furnace 12.

A first embodiment designed for sample production and feasibility studies includes a conveying means which comprises a first conveyor 20 of the double chain type for conveying glass sheets through furnace 12 and into shaping station 16 and a second conveyor 22 also of the double chain type which conveys a tempering ring 70 for moving one sheet at a time between shaping station 16 through the cooling station 14 to the unloading station 15. A skeleton support structure 21 is provided for the conveyors 20 and 22 as well as the various stations incorporated in the apparatus.

The support bed 18 is of the type having a plurality of inlets and exhausts communicating with the upper surface thereof so that gases may be supplied over the surface of the bed to float a glass sheet in closely spaced relation thereto as described in U.S. Pat. Nos. 3,223,500 to George W. Misson and 3,223,504 to Clair W. Fredley and George E. Sleighter.

Hot gas is supplied to the upper surface of the support bed 18 by a series of gas burners and variable speed fans that control the pressure of the hot gas supplied to the upper surface of the support bed. A gas module system of the type disclosed in U.S. Pat. No. 3,223,500, the disclosure of which is incorporated by reference, is incorporated in the support bed 18 to avoid marking the glass whenever the furnace is operated in stages.

The first conveyor 20 includes a pair of longitudinally extending, parallel chains 24 mounted on sprockets 26 to form a lower run 28 laterally outside each side of the furnace. A plurality of pusher bars 30 interconnect chains 24 and extend across the furnace 12 through longitudinal slot openings in the opposite walls of the furnace for moving sheets of glass along the bed 18 and a bed extension 19 located at the shaping station 16. The conveying chains 24 are driven by conventional drive means (not shown).

The pusher bars 30 are spaced apart a distance sufficient to provide clearance for the widest glass sheets to be processed. A set of glass engaging elements 32 of size and configuration needed to bridge the gap between a portion of the glass sheet edge and the adjacent pusher bar 30 is attached to each pusher bar 30. The glass engaging end of each element 32 is shaped to conform to the portion of the edge of the glass sheet it engages to insure that glass sheets of irregular outline remain in proper alignment along the length and width of the conveyor 20 as the glass sheets are conveyed through the furnace and into the shaping station 16.

The gaseous support bed 18 extends throughout the length of the furnace to the exit end of the furnace adjacent the shaping station 16 from in front of the furnace entrance (not shown) where it provides a conventional loading station for positioning sheets of glass between adjacent pusher bars 30 with edge portions engaged by glass engaging elements 32. In the first embodiment, the first conveyor 20 moves the pusher bars 30 through the furnace 12 until a glass sheet G suitably heated to its deformation temperature arrives at the glass shaping station 16 in alignment between a lower mold 34 in the form of an outline shaping mold and an upper mold 36 in the form of a vacuum shaping mold. In this position, the conveyor stops for sufficient time for lower mold 34 to lift the aligned, heat-softened glass sheet toward the upper mold 36.

The shaping station 16 includes a gaseous support bed extension 19 comprising an upper apertured ceramic block 37 having vertical passages 38 (FIGS. 10 to 15) therein for supplying gases to its upper surface at a flow rate sufficient to support a sheet of glass G by flotation. A hot gas supply chamber 40 disposed below the apertured ceramic block 37 receives hot gas under pressure from a gas burner and discharges upward directed gaseous blasts through passages 38 to provide the gaseous support bed extension 19 at the upper surface of the ceramic block 37. In the preferred embodiment, hot gases are supplied through the passages 38 for heating as well as supporting the sheet. This heating prevents the sheet from cooling and maintains the sheet at a sufficiently high temperature to obtain an appropriate temper in the cooling station.

Figure 1:
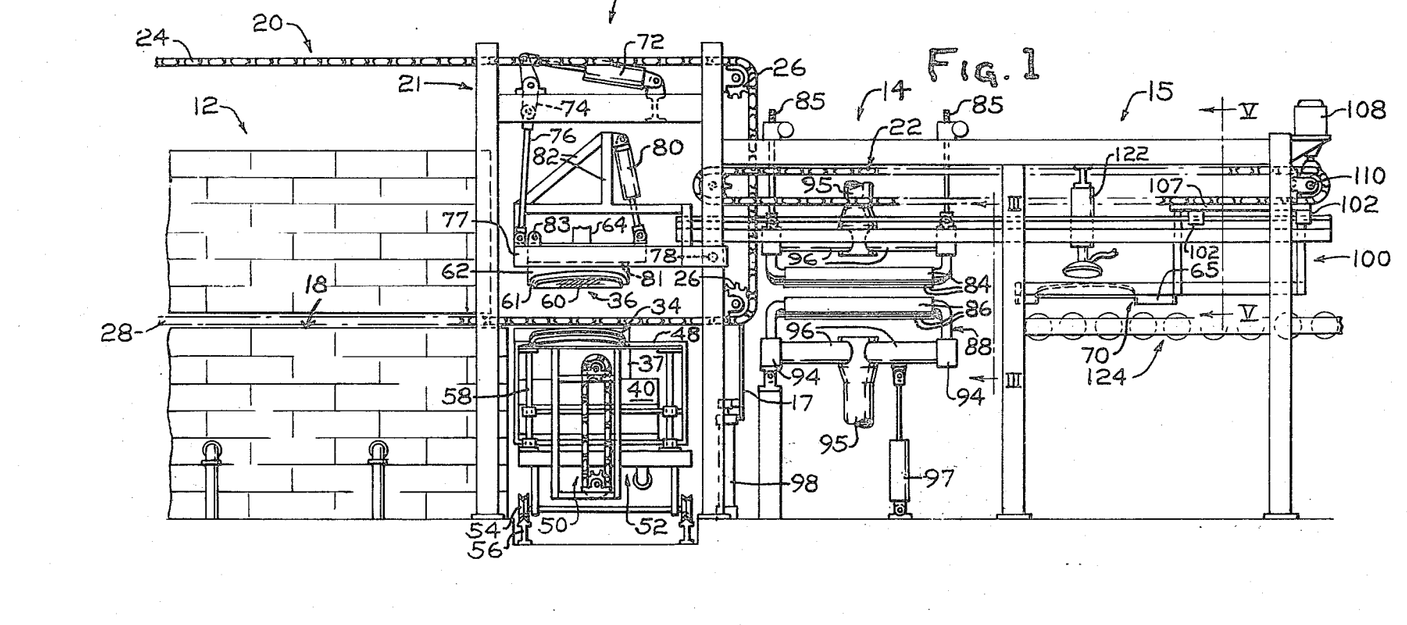
FIG. 1 is a fragmentary, longitudinal view of one embodiment of the present invention, with parts omitted for the sake of clarity.
Figures 2, 6, 7:
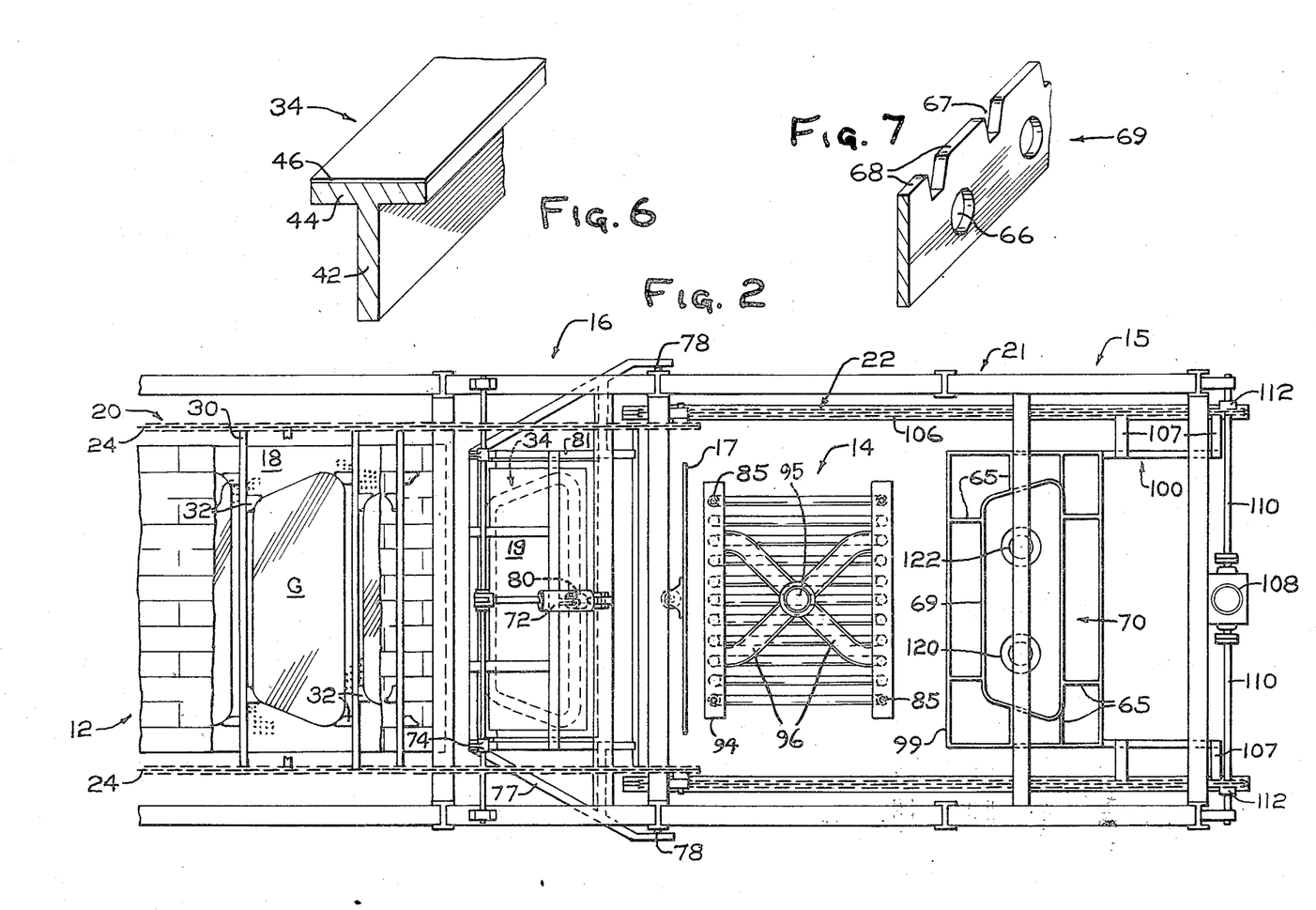
FIG. 2 is a fragmentary plan view of the embodiment of FIG. 1; with certain parts omitted or broken away to show other parts more clearly.
FIGS. 6 and 7 are enlarged, fragmentary, oblique views of a section of an outline shaping mold and of a tempering ring, respectively, forming part of the illustrative embodiments.

The gaseous bed extension 19 in the shaping station includes a peripheral recess for allowing the outline shaping mold 34 to be moved to a recessed position below the upper surface of the gaseous bed extension 19. It is to be understood that the recess may be a continuou groove spaced inside of the periphery of the bed extension 19 as depicted in FIGS. 1 and 2 or the outline shaping mold 34 may be disposed to recess into a position surrounding the periphery of the gaseous bed extension as illustrated in FIGS. 10 to 15.

The lower outline shaping mold 34 comprises a metal ring that may be either a continuous ring or may comprise articulated sections. As shown in FIG. 6, the lower mold in cross-section comprises a stem 42 and a head 44, both made of stainless steel with a refractory facing 46 bonded to the upper surface of the head 44. The refractory facing is composed of fiber glass or like refractory material that does not mar the surface of heat-softened glass when pressed thereagainst. The upper surface of the head 44 conforms to the shape desired for the outline of a bent glass sheet. The head 44 is ¼ inch thick and ¾ inch wide while the stem 42 is 1¼ inch high and ¼ inch wide in a preferred embodiment. The fiber glass cover 46 is 10 to 100 mils thick, sufficient to thermally insulate the glass from direct contact with the metal shaping rail of the lower mold.

Returning to FIG. 1, the outline shaping mold 34 is attached to a unitary frame means 48 and is vertically movable by elevator means 50 such as the chain drive means 50 of FIG. 1 or the piston means 50 of FIGS. 10 to 15. A support carriage 52 having wheels 54 riding on cross tracks 56 supports the support bed extension 19 and the elevator means 50 and is provided with vertical guide means 58 to insure that the unitary frame 48 and the outline shaping mold 34 attached thereto move vertically relative to the support carriage 52. The support carriage normally occupies a position with the outline bending mold 34 vertically aligned directly beneath the upper shaping mold 36, but is movable laterally to a position to one side of the first conveyor 20 to enable an operator to obtain access to the elements of the shaping station 16 whenever maintenance is needed or a production pattern is changed, thus requiring a change of the outline shaping mold 34 and the upper shaping mold 36.

The upper shaping mold 36 is a conventional vacuum mold having a ceramic apertured lower wall 60 shaped to conform to the shape desired for the upper surface of the glass sheet and forming the bottom of a chamber 61 secured to a vacuum mold support box 62 above chamber 61. The box 62 is connected to a vacuum source (not shown) through a duct 64.

The vacuum mold support box 62 can be lifted and/or pivoted when desired to provide clearance for the introduction of a tampering ring 70 beneath the vacuum shaping mold 36. A first piston 72 having one end pivotally supported on an upper cross beam of frame support structure 21 has the free end of its piston rod pivotally attached to a crooked lever arm 74 which, in turn, is pivotally supported on the frame support structure 21. The crooked lever arm 74 is connected to a connecting rod 76 of adjustable length. The latter, in turn, is pivotally connected at its lower end to an outer frame 77. The latter is pivotally connected at its forward end to frame support structure 21 by pivot means 78. The outer frame 77 also includes a superstructure 82.

A second piston 80 has the lower end of its piston rod pivotally secured to an inner frame 81 fixed to box 62. The upper end of the second piston 80 is pivotally attached to the superstructure 82. The inner frame 81 is pivotally mounted on outer frame 77 through pivot means 83 at its rear end. Piston 80 thus actuates upward pivoting of the front end of vacuum mold 36 with inner frame 81 about pivot means 83, while piston 72 actuates upward pivoting of the rear end of the vacuum mold 36 together with both inner frame 81 and outer frame 77 about pivot means 78. When pistons 72 and 80 are both actuated for upward rotation, they can lift the upper mold 36 entirely from a lower position for receiving a glass sheet G lifted by the outline shaping mold 34 and an upper retracted position to provide clearance for the tempering ring 70 to move into and out of shaping station 16.

Figure 3:
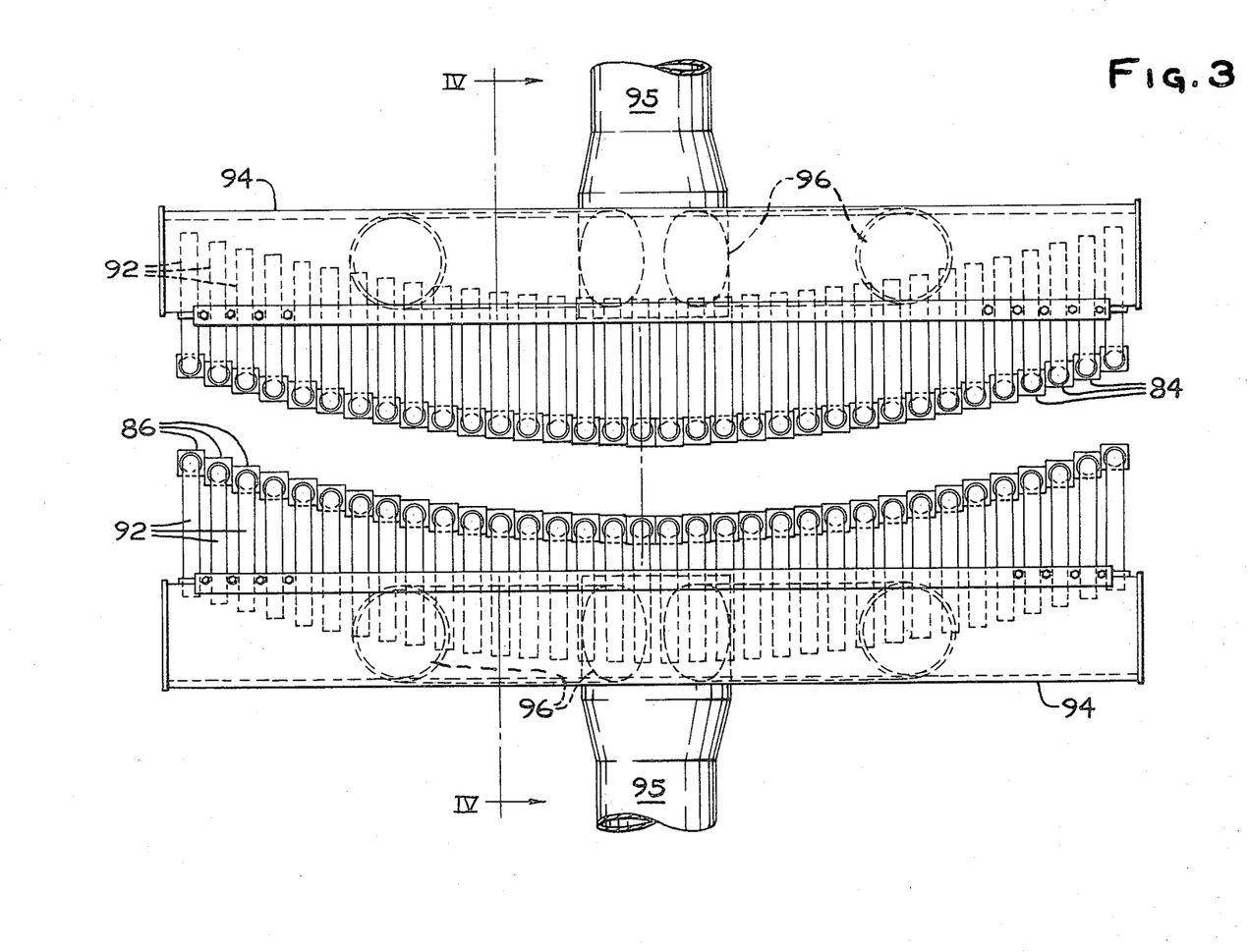
FIG. 3 is an enlarged end elevation of the cooling station forming part of the embodiment of FIG. 1 along the lines III—III of FIG. 1.
Figure 4:
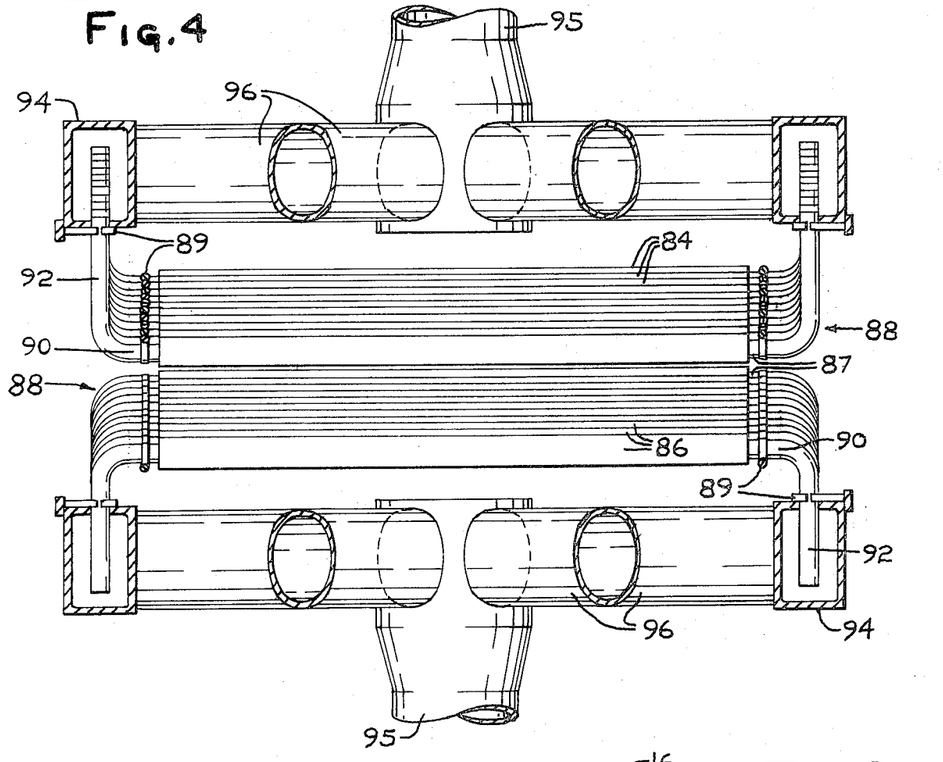
FIG. 4 is an end view of the cooling station of FIG. 3.

The cooling station is shown in detail in FIGS. 3 and 4 and comprises an upper set of pipes 84 having longitudinally spaced apertures facing downward and a lower set of pipes 86 having longitudinally spaced apertures facing upward. Each pipe is of rectangular cross-section, extends parallel to the path of the conveyors 20 and 22 and has an adapter 87 at each end attached to one or the other of a pair of longitudinally aligned elbows 88 through clamps 89 (FIG. 4). Each elbow 88 has a horizontal portion 90 attached by a clamp 89 to an adapter 87 at one end of one of the pipes and a vertical portion 92 axially adjustable to interfit within a receiving aperture of a front or rear upper or lower end plenum 94. Additional clamps 89 lock the vertical portions 92 in an adjusted position relative to its receiving plenum 94. Each plenum extends transversely of the axis of glass movement through the apparatus. Vertical adjustment of each elbow relative to its attached plenum is arranged to provide a pair of discontinuous apertured walls conforming generally to the shape of the glass sheets undergoing treatment. Air under pressure is imparted from a blower (not shown) through upper and lower flexible ducts 95 to feeder lines 96 arranged in crisscross patterns to the end plenums 94 and thence to the upper and lower apertured pipes 84 and 86 to the opposite surfaces of a glass sheet at the cooling station. The lower feeder lines 96 are supported on a plate attached to a vertically movable piston 97 (FIG. 1) and moves vertically therewith while the upper end plenums 94 are attached to the lower ends of vertically adjustable rods 85 supported from a portion of skeleton support 21. The positions of the plenums 94 and the feeder lines 96 are adjusted to control the distance between the upper pipes 84 and the upper surface of a glass sheet in the cooling station and the distance between the lower pipes 86 and the lower surface of said glass sheet.

The shield 17 is located in a vertical plane just before the cooling station 14 and is rigidly attached to a vertically movable piston means 98. The shield is thin, flat and of rectangular cross-section and is composed of lightweight heat resistant material such as aluminum or a lightweight alumina-silica refractory. The shield 17 is so dimensioned that when the piston means 98 is in its down position, the upper edge of the shield provides clearance to move the tempering ring 70 between the shaping station 16 and the cooling station 14. When the piston means 98 is raised, the shield 17 prevents air blasted through the apertured pipes 84 and 86 from blowing toward the shaping station 16 and the furnace 12.

The tempering ring 70 is in the form of an outline rail of stainless steel or the like having a contour and outline that conforms to the shape imparted to the glass sheet G and consists essentially of a shaping rail 69 approximately 1½ inches wide and ⅛ inch thick oriented with its width in a vertical plane and its thickness tapering to 1/16 inch at its upper edge surface 68. The latter has a shape conforming to the shape slightly inside the perimeter of the glass sheet. The upper edge is provided with spaced serrations 67 about ¼ to ⅝ inch deep and ⅛ to 3/16 inch wide spaced about ¼ inch between serrations. The rail is curved convexly in elevation at each end of each serration. The rail 69 is also provided with apertures 66 about ¼ inch to ⅜ inch diameter spaced slightly below the bottom line of the serrations and between adjacent serrations to minimize throttling of the flow of blasts of tempering fluid along the line of glass sheet support. Thus, the tempering ring 70 is of minimum heat capacity consistent with adequate structural rigidity and is of relatively light weight compared to the mass of the outline shaping ring 34.

Spaced connecting members 65 extend outward from their connections to the outer wall of rail 69 for rapid connection to or disconnection from a reinforcing frame 99 at the trail end of a reinforced open frame carriage 100. The latter is provided with a plurality of sleeves 102 that slide on one or the other of a pair of rails 104 that extend longitudinally parallel to the drive chains 106 of the second conveyor 22 and are supported by skeleton support 21. Certain links of each drive chain are connected to platforms 107 (FIG. 1) to enable the carriage 100 and its attached tempering ring 70 to move in response to actuation of the chains 106.

A reversible drive motor 108 acts through a drive shaft 110 which contains sprockets 112 engaging the drive chains 106 to move the carriage 100 and its attached tempering ring 70 along a path defined by the rails 104. The tempering ring 70 and its attached carriage 100 are constructed and arranged and the rails 104 and the drive chains 106 extend a sufficient distance to enable the carriage 100 and its supported tempering ring 70 to move in response to actuation by the reversible drive motor 108 from a first position where the tempering ring 70 is disposed directly below the vacuum shaping mold 36 at the shaping station 16 between the apertured pipes 84 and 86 at the cooling station 14 to a second position at the unloading station 15. In addition, means is provided as is well known in the art to reciprocate the reversing mechanism for the drive motor 108 when a tempering ring 70 supports a glass sheet G between the apertured pipes 84 and 86 in the tempering station.

The various conveyors are operated according to a cycle controlled by a cycle control means (not shown). A suitable apparatus for coordinating the movements of the various elements of the apparatus so as to synchronize the operating cycle is a device known as a Programmable Matrix Controller 1750 PMC made and sold by the Allen Bradley Company of Milwaukee, Wis.

Means such as nuts and bolts and aligned openings are provided to readily disconnect the spaced connecting members 65 form the reinforcing frame 99 whenever production demands a change in production pattern. The tempering ring 70 of a production pattern to be discontinued is readily removed and another tempering ring conforming to another pattern is attached to the frame 99 at the same time as chamber 61 on upper vacuum shaping mold 36 is being removed from support box 62 and outline shaping mold 34 is being detached from the unitary frame 48 and replaced by another chamber 61 and another outline shaping mold 34 conforming to the new production pattern.

Figure 5:
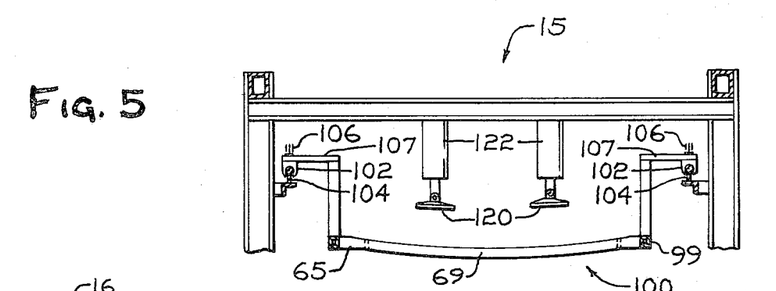
FIG. 5 is a fragmentary sectional view along the lines V—V of FIG. 1 showing some details of an unloading station.

The unloading station 15 comprises vacuum means 120 supported for vertical movement by piston means 122 according to a program of movement to be described hereinafter. The beginning of an unloading conveyor 124 is located below the vacuum means 120 and the piston means 122. Conveyor 124 extends in a forward direction from its beginning for removing glass sheets from the unloading station 15 to another station for inspection, handling and any other desired treatment.

ALTERNATE EMBODIMENT

Figure 8:
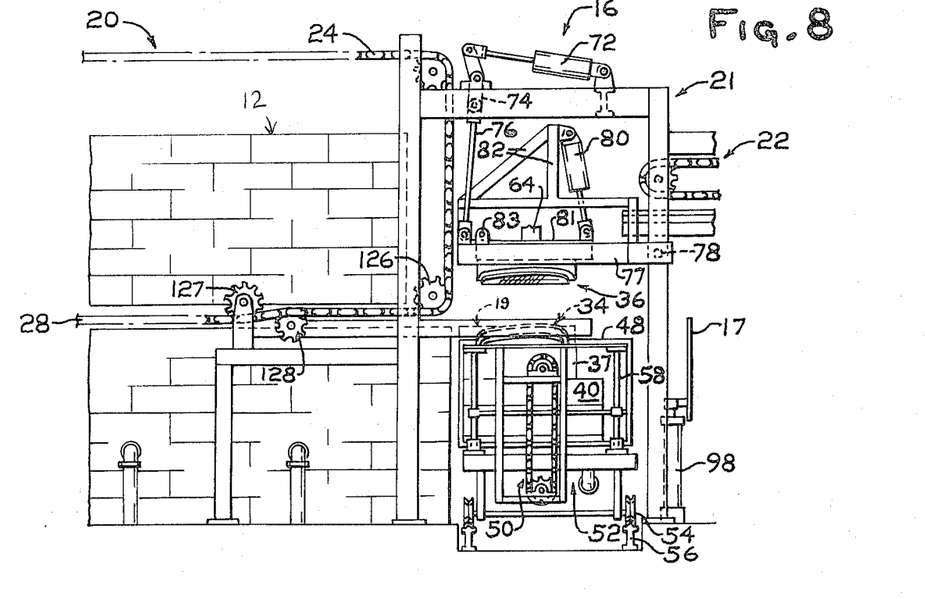
FIG. 8 is a fragmentary view similar to FIG. 1 of a portion of an alternate embodiment.
Figure 9:
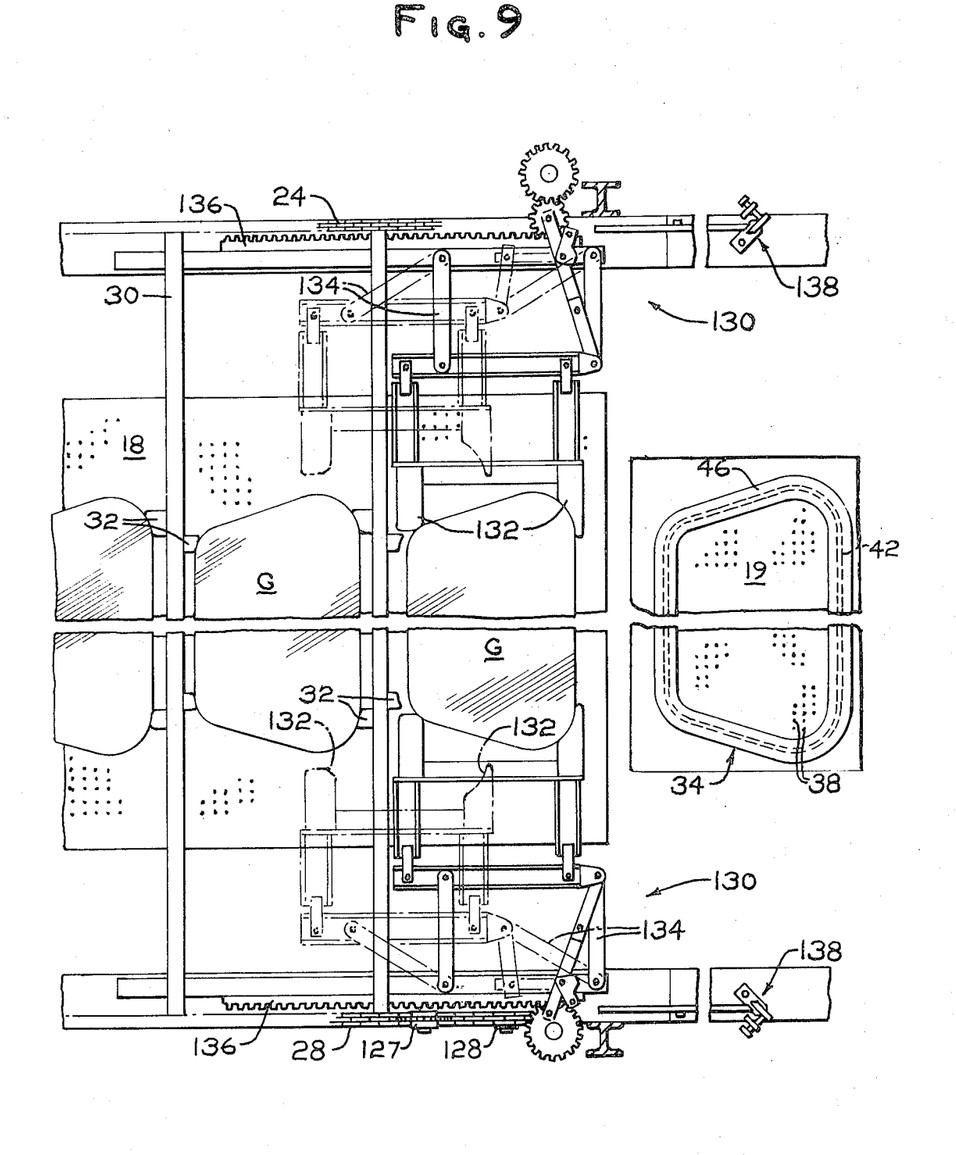
FIG. 9 is an enlarged plan view of a transfer mechanism used in the alternate embodiment of FIG. 8, and FIGS. 10 to 15 are schematic views of moving elements of the shaping, cooling and unloading station showing how both embodiments of the present apparatus operate during different stages of a shaping and cooling cycle.

While the first embodiment of the present invention shows a first conveyor extending throughout the length of the furnace 12 and the shaping station 16, it is appreciated that the first conveyor may terminate at the exit end of the furnace 12 and shuttle mechanism of the type depicted in FIGS. 8 and 9 which is of the type shown and described in U.S. Pat. No. 3,574,588 to N. C. Nitschke, the disclosure of which is incorporated herein by reference, may be used to transfer a glass sheet rapidly from the exit end of the furnace 12 and into the shaping station 16. This alternate embodiment makes it possible to move glass sheets continuously through the furnace 12 instead of in stages. Continuous glass sheet movement in the furnace makes it possible to minimize surface damage to the glass when the latter is held in fixed relation to hot gas flows that heat and support the glass sheets when the latter are heat-softened within the furnace in stages.

In order to make the high-speed transfer operable, each chain 24 of the first conveyor 20 is entrained about one of a pair of lifting sprockets 127 and 128. In addition, the lower sprockets 126 at the exit end of furnace 12 are located at a slightly higher position than the corresponding sprockets 26 of the first embodiment. The purpose of elevating the lower run 28 of the chains 24 near the furnace exit is to provide disengagement between the glass engaging elements 32 which extend from pusher bars 30 to engage the front and read edges of the glass sheet. Lifting sprockets 127 and 128 are positioned relative to one another so that the lower runs 28 of chains 24 move under sprockets 127 and over sprockets 128 and then on to engagement beneath lower end sprockets 126 so that the pusher bars 30 and the attached glass engaging elements 32 which guide the glass sheets G for movement through the furnace are disengaged from glass contact.

The high speed transfer means shown generally at 130 in FIG. 9 comprises a pair of movable, collapsible four-sided frames 134, to each of which is attached a set of glass engaging fingers 132 which travel in the same plane as the glass sheets G. The collapsible frames serve as extending and retracting means 134 for moving the glass engaging fingers 132 between an extended position shown in solid lines and a retracted position shown in phantom. A movable rack 136 is provided as described in the aforesaid U.S. Pat. No. 3,574,588 to Nitschke to transfer each collapsible frame 134 between a first position within the furnace to a second position at the shaping station. In addition, means is provided to extend each four-sided frame inward to cause the fingers 132 to engage the side edges of the glass sheet G when racks 136 are moved forward to the glass shaping station 16. Retractors 138 are positioned to engage the collapsible frames 134 so that the fingers 132 are retracted after the glass sheet G is conveyed to the glass shaping station 16 and the collapsible frames begin their return to the furnace. With the glass sheet on mold 34, the racks 136 are returned with fingers 132 retracted to the position depicted in FIG. 9 in phantom to receive a succeeding glass sheet.

Details of the high-speed transfer mechanism do not form part of the present invention, so the details contained in the aforesaid Nitschke patent are not repeated in the present specification in order to minimize its length.

CYCLE OF OPERATION

The cycle of operation of the preferred embodiments described previously will be recited in order to clarify how the present invention provides an improvement over prior art vacuum forming methods and apparatus. With reference particularly to the schematic drawings of FIGS. 10 to 15, the treatment of three successive glass sheets G1, G2 and G3 will be shown. It is understood that the use of a Programmable Matrix Controller such as one available as 1750 PMC of the Allen Bradley Company of Milwaukee, Wisconsin is helpful in coordinating the cycle of movements described hereinafter. Such a device is readily avilable commercially and forms no part of the present invention.

Figure 10:
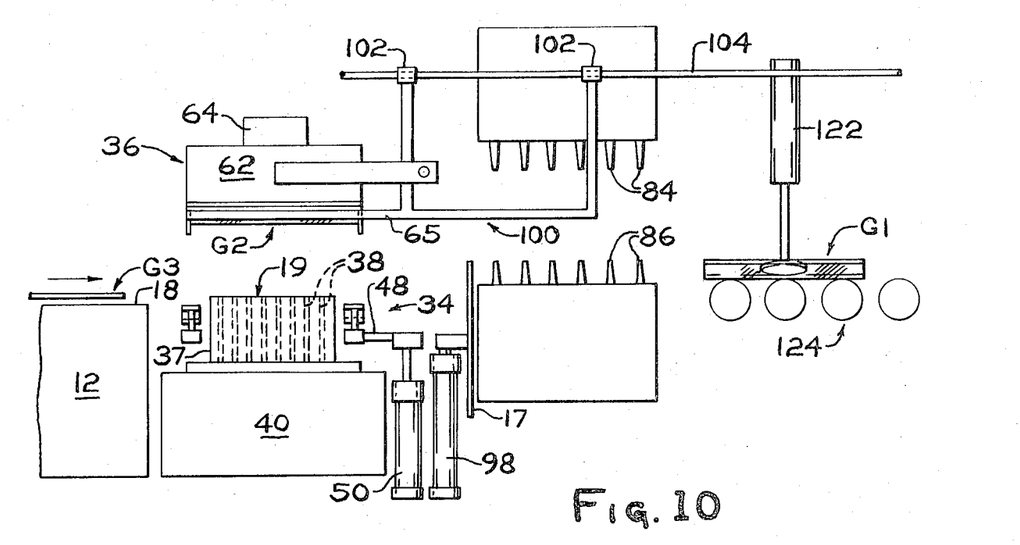

FIG. 10 shows a stage in the cycle when a glass sheet G1 that has already been shaped and cooled is lowered onto the unloading conveyor 124 while vacuum is applied to the vacuum means 120 and the rod of piston 122 is extended downward. At this time, the carriage 100 is located at one extreme of its path of movement with tempering ring 70 supporting a glass sheet G2 in alignment under the vacuum shaping mold 36. The vacuum has just been released on the vacuum mold 36 so the glass sheet G2 has been deposited upon the tempering ring 70. The latter provides a series of short lines of continuous support that extends completely around the marginal portion of the glass sheet G2 slightly inwardly of the margin of the sheet G2. At this time, a third glass sheet G3 is still being heated to its deformation temperature within the furnace 12. Shield 17 and lower outline shaping mold 34 are in their downward positions.

Figure 11:
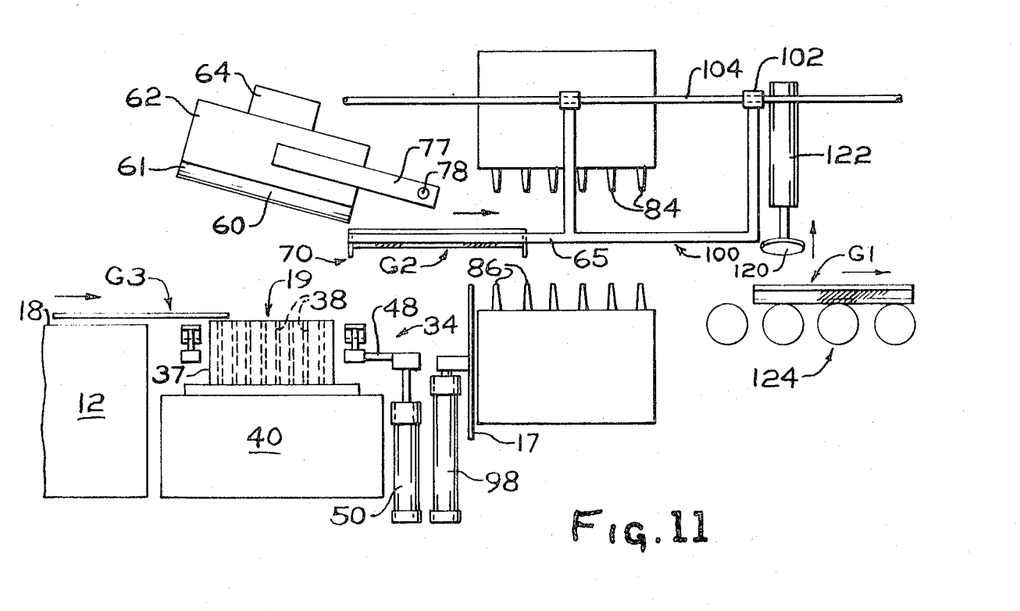

By the next stage of the cycle depicted in FIG. 11, the vacuum on vacuum means 120 has been released so that glass sheet G1 has been deposited onto the unloading conveyor 124, and piston means 122 has begun to retract vacuum means 120 upwards. Vacuum shaping mold 36 has been moved to an upper recessed position with no vacuum applied to provide clearance for tempering ring 70 to move toward the cooling station 14, which movement is underway. Shield 17 remains in its downward position to provide a clear path for moving the carriage 100 and its attached tempering ring 70 into the cooling station 14. Outline shaping mold 34 remains in its lowered recessed position relative to the gaseous hearth extension 19 to await the arrival at the shaping station 16 of glass sheet G3, which is leaving furnace 12. Tempering ring 70 continues to move with glass sheet G2 supported thereon into alignment between the upper set of pipes 84 and the lower set of pipes 86. At this point, piston means 98 extends its piston rod upward to move shield 17 into its upper position, the Programmable Matrix Controller actuates valve means (not shown) to permit air under pressure to blast through the openings in pipes 84 and 86 and also actuates reciprocating means for reversible drive motor 108 to reciprocate the tempering ring 70 over a displacement of a few inches to avoid establishing an iridescent pattern in the glass sheet G2 as tempering medium is blasted against its opposite surfaces. As an alternative, it is understood that the tempering ring 70 may be stopped in a position of alignment between the sets of pipes 84 and 86 and the latter reciprocated or moved orbitally relative to glass sheet G2 as is well known in the tempering art.

Figure 12:
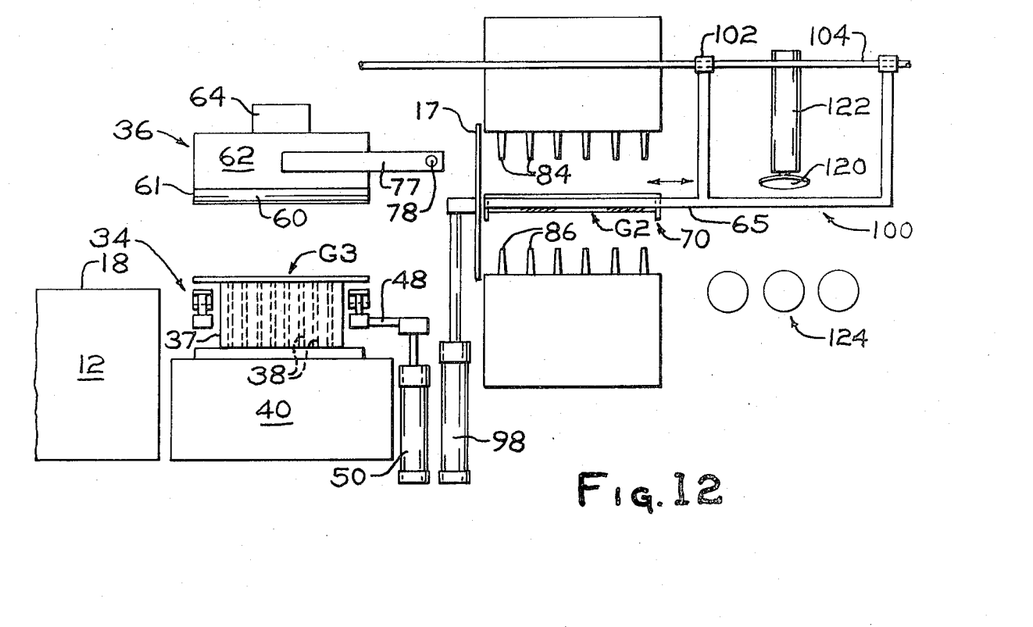

By the time the cycle has reached the stage depicted in FIG. 12, unloading conveyor 124 has removed glass sheet G1 to the right where it can be inspected and packaged. Piston means 122 has lifted vacuum means 120 into its upward retracted position to await the arrival of glass sheet G2. The latter is continuing its reciprocation at the cooling station 14 while tempering medium is applied through the sets of apertured pipes 84 and 86 with screen 17 remaining in its "up" position to inhibit cooling of the shaping station 16. Glass sheet G3 has arrived at the shaping station 16 over gaseous bed extension 19 with elevator means 50 in readiness to lift the unitary frame 48 and its attached outline shaping mold 34 upward. The vacuum shaping mold 36 has resumed its normal position with its apertured shaping wall 60 disposed in aligned relation above the outline shaping mold 34.

Figure 13:
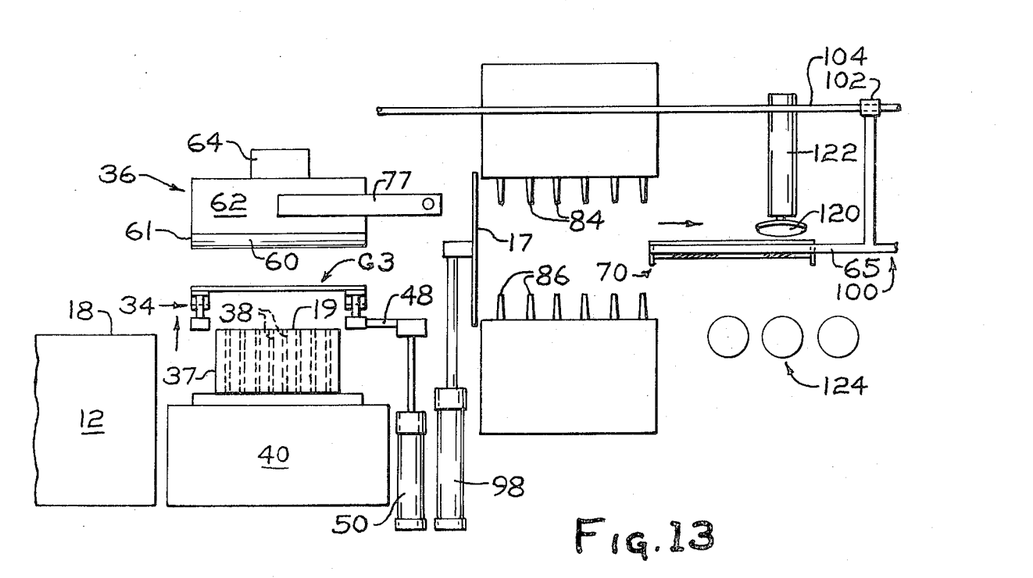
Figure 14:
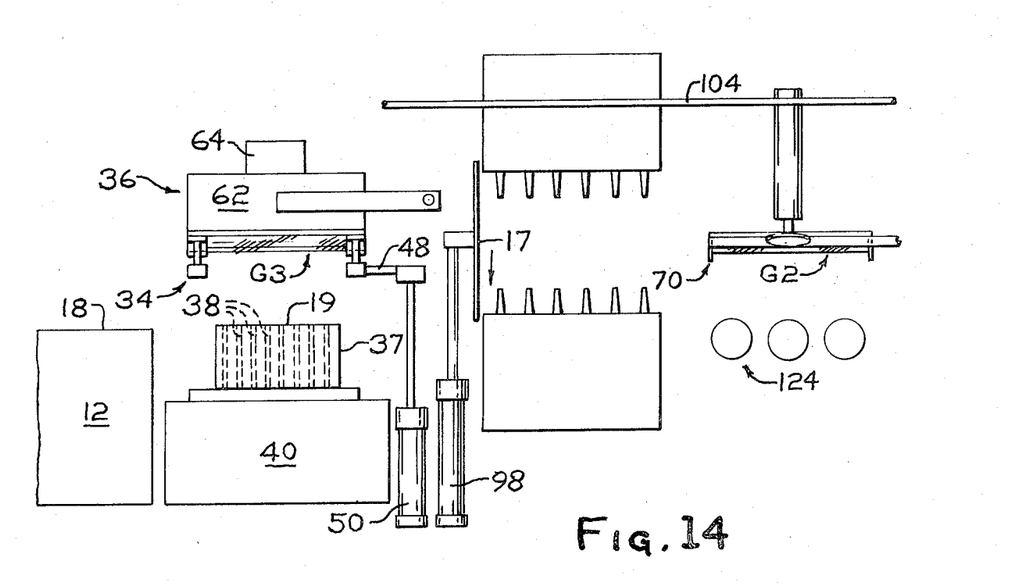

When the cycle reaches the stage depicted in FIG. 13, the flow of tempering medium into the upper and lower sets of pipes has been discontinued, the tempering ring 70 with cooled glass sheet G2 supported thereon has stopped reciprocating and reversible drive motor 108 is moving the carriage 100 with its glass sheet loaded tempering ring into the unloading station 15. Outline shaping mold 34 has engaged glass sheet G3 and is lifting the latter toward the apertured shaping wall 60 of the vacuum shaping mold 36. Shield 17 is still in its "up" position between the shaping station 16 and cooling station 14.

At approximately the time tempering ring 70 reaches a position aligned with the piston means 122 and the vacuum means 120, vacuum is applied to the vacuum means 120 and the piston means 122 moves the latter downward until the vacuum means 120 engages the upper surface of glass sheet G2 and retracts upward while supporting the bent glass sheet G2 by suction. Also at approximately this time, glass sheet G3 has been sandwiched in pressurized engagement between the upper vacuum shaping mold 36 and the lower outline shaping mold 34. At this stage depicted in FIG. 14, the shield 17 remains in its "up" position, but the Programmable Matrix Controller is about to actuate piston 98 to lower shield 17.

Figure 15:
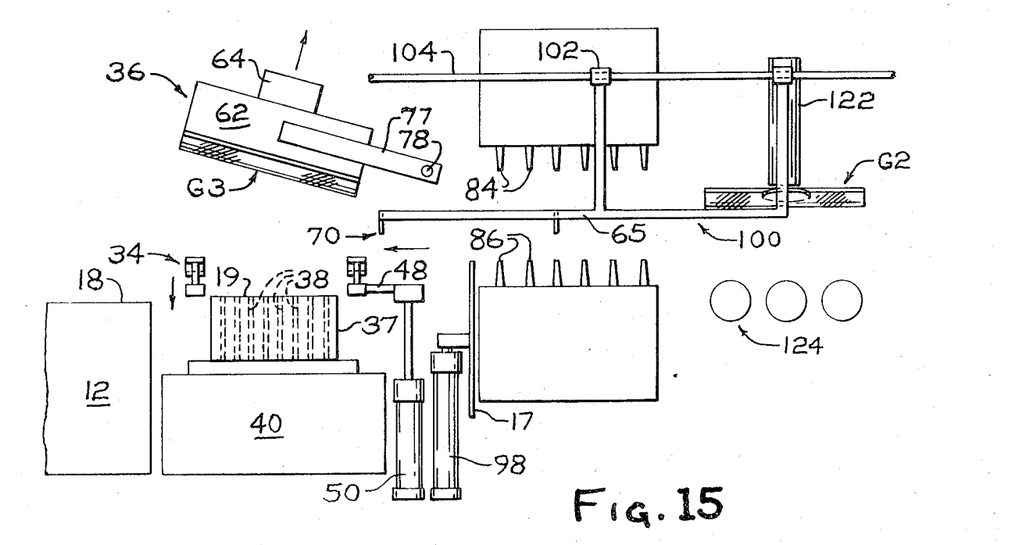

As soon as glass sheet G2 is secured on the vacuum means 120 and piston means 122 retracted upward to separate glass sheet G2 from tempering ring 70, the Programmable Matrix Controller reverses the reversible drive motor 108 to move the unloaded tempering ring 70 back toward the shaping station 16. Shield 17 is lowered and vacuum shaping mold 36 with vacuum applied to hold glass sheet G3 thereon by suction is raised to an elevated retracted position and outline shaping mold 34 is lowered with unitary frame 48 by actuation of elevator means 50 to provide clearance to move the tempering ring 70 into its proper position of alignment at the shaping station 16. In FIG. 15, this arrangement is depicted. These movements continue until the moving elements reach the positions depicted in FIG. 10, at which time a new cycle starts.

The present arrangement of using a different tempering ring 70 for moving the glass sheets into the cooling station rather than one of the shaping molds 34 or 36 as in the prior art has resulted in a considerable reduction of time needed for a complete cycle. The minimum possible time cycle for completely processing a glass sheet required 28 seconds prior to the present invention. Since some of the cooling and removing cycle for one glass sheet can be accomplished while another glass sheet is being shaped, it is possible to complete a cycle of shaping and tempering in 19 seconds using the present invention versus 28 seconds for the prior art.

The present invention, in the handling of glass sheets for shaping and cooling, is also characterized by first supporting a glass sheet to be treated on a lower mold having a shaping surface conforming to the shape desired for the shaped glass sheet, then sandwiching the sheet in pressurized engagement between said lower mold and an upper mold having a complementary shaping surface, then supporting the glass sheet against the shaping surface of the upper mold while the lower mold is retracted and then supporting the glass sheet substantially entirely around its periphery and adjacent its marginal edge on a tempering ring which conveys the glass from the shaping station to a cooling station and during its residence at said cooling station where the supported shaped glass sheet is chilled by blasts of tempering medium while said tempering ring positively supports said sheet around its periphery. In the preferred embodiment of the invention, the lower mold has an outline shaping surface and the upper mold is provided with vacuum means for supporting the glass against it after it is shaped by press bending. However, it is also envisioned that the shaped glass sheet may be supported against the shaping surface of the upper mold by hot pressurized gas applied against the lower surface of the glass sheet until such time as the tempering ring is in a position to receive the shaped glass sheet and transport it to the cooling station.

The form of the invention shown and described in this disclosure represents a preferred embodiment and certain modifications thereof. It is understood that various changes may be made, particularly in the details of programming the steps of a typical production cycle, changing the materials and dimensions of the apparatus components and the like without departing from the gist of the invention as defined in the claimed subject matter that follows.

What is claimed is:
1. In a method of handling a glass sheet comprising
    (a) supporting said glass sheet while said sheet is at its deformation temperature between a lower shaping mold and an upper shaping mold having complementary shaping surfaces conforming to the shape desired for said glass sheet,
    (b) lifting said lower shaping mold to engage said heated glass sheet along its lower surface until said engaged glass sheet is sandwiched between said lower shaping mold and said upper shaping mold, and
    (c) supporting said glass sheet by vacuum against said upper shaping mold.
the improvement comprising
    (1) retracting said lower shaping mold from said upper shaping mold while supporting said glass sheet by vacuum against said upper shaping mold,
    (2) introducing means to support said glass sheet adjacent its marginal edge *only* to a position aligned immediately adjacent to and below said upper mold and above said lower mold,
    (3) releasing said glass sheet from said upper mold with said glass sheet support means disposed thereinbeneath to deposit said glass sheet onto said glass sheet support means,
    (4) transferring said glass sheet while on said glass sheet support means to a cooling station,
    (5) immediately cooling said glass sheet with tempering medium while supported on said glass sheet support means at a rapid enough rate to impart at least a partial temper to the glass sheet, and
    (6) removing said glass sheet from said glass sheet support means after said cooling.

2. A method of handling a glass sheet as in Claim 1, wherein said glass sheet support means is a tempering ring that supports said glass sheet at sufficient points at said cooling station between upper and lower means for applying tempering medium toward the opposite surfaces of said glass sheet, and said tempering ring is reciprocated while supporting said glass sheet between said upper and lower means at sufficient support points extending completely around the periphery of said supported glass sheet to insure positive support during said reciprocation.

3. A method as in Claim 2, wherein said glass sheet is supported by a tempering ring that is relatively light and has less heat capacity than said lower shaping mold.

4. A method of handling a series of glass sheets on a mass-production basis comprising transporting said series of glass sheets and applying heat thereto until the leading glass sheet in said series is heated to its deformation temperature, conveying said leading glass sheet to a position between a lower shaping mold and an upper shaping mold having complementary shaping surfaces conforming to the shape desired for said glass sheet, lifting said lower shaping mold to engage said heated glass sheet along its lower surface until said engaged glass sheet is sandwiched between said lower shaping mold and said upper shaping mold, supporting said glass sheet by vacuum against said upper shaping mold, transferring said glass sheet from said upper shaping mold to support means interposed between said upper and lower molds to support said glass sheet adjacent its marginal edge only, moving said support means with said shaped glass sheet supported thereon from between said molds to a cooling station, immediately cooling said glass sheet with tempering medium at a rapid enough rate to impart at least a partial temper to the glass sheet, treating the next succeeding glass sheet in said series in a manner similar to the treatment of said leading glass sheet, including conveying said next succeeding glass sheet to said position between said upper mold and said lower mold before said leading glass sheet is removed from said support means, removing said leading glass sheet from said support means and returning said support means to a position near said position between said upper mold and said lower mold to move into said latter position in time to receive said next succeeding glass sheet when said next succeeding glass sheet is released from said upper mold.

5. A method as in claim 4, wherein each glass sheet in said series is supported about its marginal edge portion during said cooling at a sufficient number of support points around the entire periphery of said supported glass sheet to insure positive support of said glass sheet, and wherein said glass sheet is reciprocated while it is provided said-positive support during said coding.

6. Apparatus for handling a glass sheet comprising a shaping station and a cooling station, said shaping station comprising an upper mold and a lower mold, said molds having complementary shaping surfaces conforming to the shape desired for said glass sheet, means for providing relative motion in a vertical direction between said upper and lower molds between a retracted position and a glass sandwiching position, means for delivering a heat-softened glass sheet to a position in alignment between said upper and lower molds when the latter are in their retracted position, means for raising said lower mold to lift said delivered glass sheet into said glass sandwiching position to impress a shape onto said glass sheet conforming to said complementary shaping surfaces, said upper mold having an apertured shaping surface and vacuum means adapted to apply a vacuum through said apertured shaping surface to hold a shaped glass sheet thereagainst, glass sheet supporting means constructed and arranged to provide a multitude of support points extending around the entire periphery of the shaped glass sheet adjacent its periphery only, means for moving said glass sheet supporting means between a position at said cooling station and a position aligned between said upper mold and said lower mold at said shaping station to receive said glass sheet, said cooling station comprising upper and lower nozzles and means to deliver cooling medium under pressure through said nozzles, and means to coordinate the movement of said upper mold, said lower mold and said glass sheet supporting means to deliver said glass sheet to said position at said shaping station with said upper mold and lower mold in their retracted positions, to raise said lower mold to lift said glass sheet into said glass sandwiching position to shape said glass sheet, to apply said vacuum means to hold said glass sheet against said upper mold, to retract said upper and lower molds, to move said glass sheet supporting means into said position between said upper mold and said lower mold at said shaping station, to deactivate said vacuum means to deposit said glass sheet on said glass sheet support means, to move said glass sheet support means with said deposited glass sheet thereon to said cooling station and to actuate said cooling medium delivery means to apply said cooling medium against said glass sheet supported on said glass sheet supporting means while said glass sheet supporting means is provided with motion relative to and between said upper and lower nozzles.

7. Apparatus as in claim 6, further including shielding means located between said shaping station and said cooling station and means connected to said shielding means to raise or lower said shielding means.

8. Apparatus for handling a glass sheet comprising a furnace, a shaping station and a cooling station, first conveyer means for moving a glass sheet through said furnace and into said shaping station, said shaping station comprising an upper mold and a lower mold having complementary shaping surfaces conforming to the shape desired for said glass sheet, elevator means connected to said lower mold to move said lower mold between a retracted position below said first conveyor means and an upper position sufficiently close to said upper mold to enable said lower mold and said upper mold to apply pressure engagement against the opposite surfaces of a heat-softened glass sheet held therebetween, means for moving said upper mold between said pressure engaging position and an upward recessed position, means operatively associated with said upper mold for holding said glass sheet thereagainst, a tempering ring comprising an outline member having a shape and contour conforming to that of a glass sheet shaped to conform to said complementary shaping surfaces, second conveyor means for moving said tempering ring in a substantially horizontal direction between a position at said shaping station intermediate and in alignment between said upper mold and said lower mold to receive said glass sheet and a position at said cooling station, means to reciprocate said tempering ring at said cooling station, means to impart tempering medium under pressure against the opposite surfaces of a shaped glass sheet supported on said tempering ring at said cooling station, and means to coordinate movement of said molds and said tempering ring to lift said lower mold toward said upper mold when a glass sheet conveyed by said first conveyor means arrives at said shaping station in alignment between said upper mold and said lower mold and said tempering ring is outside said shaping station, to actuate said means to hold said glass sheet against said upper mold, and while said holding means holds said glass sheet thereagainst, to lower said lower mold and cause said second conveyor means to move said tempering ring into said position intermediate and in alignment between said upper mold and said lower mold, to deactivate said glass sheet holding means when said tempering ring is in said position of alignment to deposit said glass sheet onto said tempering ring and to actuate said second conveyor means to transfer said tempering ring while it supports said glass sheet after it is shaped for movement from said position intermediate said upper mold and said lower mold to said position at said cooling station.

9. Apparatus in claim 8, further including means to shield said shaping station and said furnace from said cooling when tempering medium is applied under pressure at said cooling station and means to impart vertical movement to said shield between an upper shielding position and a lower position wherein clearance is provided for said horizontal movement of said tempering ring between said shaping station and said cooling station.

10. Apparatus as in claim 8, wherein said second conveyor means extends beyond said cooling station to the side opposite said shaping station to an unloading station, further including means engaging said tempering ring to said second conveyor means to enable said second conveyor means to transport said tempering ring between said position intermediate said upper mold and said lower mold to said cooling station, to reciprocate said tempering ring at said cooling station and thence to move said tempering ring to said unloading station and finally to return said tempering ring to said position at said shaping station intermediate said upper mold and said lower mold.

11. In a method of handling a glass sheet during shaping and cooling comprising
  (a) supporting said glass sheet while heat softened at a shaping station on a lower mold having an upper shaping surface conforming to the shape desired for said glass sheet,
  (b) then supporting said glass sheet in pressurized engagement between said lower mold and an upper mold having a shaping surface conforming to the shape desired for said glass sheet,
  (c) then retracting said lower mold from said upper mold and supporting said glass sheet by vacuum against said upper mold only,
the improvement comprising
  (1) introducing means to support said shaped glass sheet about its periphery only into a position of alignment between said upper mold and said lower mold to receive said shaped glass sheet supported against said upper mold only,
  (2) then transferring said glass sheet so said glass sheet support means and positively supporting said glass sheet on said glass sheet support means at sufficient points around substantially its entire periphery slightly inside its marginal edge,
  (3) then transferring said glass sheet from between said upper mold and said lower mold to a cooling station,
  (4) thereafter applying tempering medium at said cooling station at a rate rapid enough to impart at least a partial temper to said glass sheet, and (5) removing said glass sheet from said glass sheet support means after said cooling.

12. A method as in claim 11, wherein said glass sheet is supported on said lower mold about its marginal portion only.

13. Apparatus for handling glass sheets comprising a shaping station including an upper shaping mold and a lower shaping mold having complementary shaping surfaces conforming to the shape desired for a heat-softened glass sheet, means to provide relative motion between said molds in a vertical direction between a retracted position and a glass sheet sandwiching position, means for holding a shaped glass sheet on the upper shaping mold during said relative motion between said molds to said retracted position, glass sheet supporting means to receive said shaped glass sheet from said upper mold and to support said sheet about its periphery only, a cooling station comprising upper and lower means for imparting tempering fluid toward a given path, and means for moving said glass sheet supporting means along said given path into a glass receiving position between said upper and lower molds when said molds are not in their glass sheet sandwiching position and thence to a position at said cooling station between said upper and lower tempering fluid imparting means.

14. Apparatus as in claim 13, wherein said glass sheet supporting means comprises a tempering ring and said lower shaping mold and said tempering ring each comprises a shaping rail forming at least part of a shaping frame, said lower shaping mold comprising a shaping rail of greater cross-sectional area than the shaping rail forming part of said tempering ring.

15. Apparatus as in claim 14, wherein said shaping rail of said lower shaping mold and that of said tempering ring are both endless, continuous, closed rails.

16. Apparatus as in claim 14, wherein said tempering ring comprises a continuous shaping rail that has apertures and has an upper edge surface that has serrations, said apertures and said serrations providing escape paths for said tempering fluid imparted from said upper and lower tempering fluid imparting means toward a shaped glass sheet supported on said tempering ring at said cooling station.

References Cited
UNITED STATES PATENTS

| | | | |
|---|---|---|---|
| 3,607,187 | 9/1971 | McMaster | 65—106 |
| 3,607,200 | 9/1971 | McMaster | 65—182 A |
| 3,455,672 | 7/1969 | Dompkowski | 65—273 |
| 3,408,173 | 10/1968 | Leflet, Jr. | 65—104 |
| 2,940,222 | 6/1960 | Davidson, Jr. et al. | 49—84 |

S. LEON BASHORE, Primary Examiner

P. F. KRATZ, Assistant Examiner

U.S. Cl. X.R.

65—106, 268, 273, 275